US006961653B2

(12) United States Patent
Maki

(10) Patent No.: US 6,961,653 B2
(45) Date of Patent: Nov. 1, 2005

(54) DIAGNOSTIC APPARATUS FOR AN EXHAUST GAS SENSOR

(75) Inventor: Hidetaka Maki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/871,518

(22) Filed: Jun. 21, 2004

(65) Prior Publication Data

US 2005/0005690 A1 Jan. 13, 2005

(30) Foreign Application Priority Data

Jul. 10, 2003 (JP) ...................................... 2003-272770

(51) Int. Cl.[7] ......................... F02D 41/14; G01M 19/00

(52) U.S. Cl. ....................... 701/109; 701/114; 123/688; 73/118.1

(58) Field of Search ................................ 123/699, 690; 701/103–105, 109, 114; 73/1.02, 1.06, 23.31, 23.32, 118.1, 118.2; 60/274, 276, 277, 285; 204/400, 401

(56) References Cited

U.S. PATENT DOCUMENTS 3,948,228 A * 4/1976 Luchaco ..................... 123/688
5,325,711 A 7/1994 Hamburg et al. .......... 73/118.1
5,801,295 A * 9/1998 Davey et al. ................ 73/1.06
6,799,419 B2 * 10/2004 Rosel et al. .................. 60/277
2003/0131586 A1 * 7/2003 Kato et al. ..................... 60/274
2004/0000493 A1 * 1/2004 Yasui et al. ................. 204/401
2004/0010364 A1 * 1/2004 Yasui et al. ................. 701/114
2005/0061067 A1 * 3/2005 Maki et al. ................ 73/118.1

FOREIGN PATENT DOCUMENTS

JP 07-145751 6/1995

* cited by examiner

*Primary Examiner*—Willis R. Wolfe, Jr.
(74) *Attorney, Agent, or Firm*—Arent Fox PLLC

(57) ABSTRACT

A deterioration failure diagnostic apparatus for an exhaust gas sensor has a higher detection precision and a wider detection range against the deterioration failure of the exhaust gas sensor. An exhaust gas sensor is disposed in an exhaust gas pipe of an internal-combustion engine for producing an output corresponding to components of exhaust gas of the engine. The apparatus has a device for producing a detecting signal, which is multiplied to a basic fuel injection amount used at a normal operation to produce a fuel injection amount to be used for determining a condition of the exhaust gas sensor. The apparatus includes a device for extracting a frequency response corresponding to the detecting signal from an output of the exhaust gas sensor. The output is in response to the calculated fuel injection amount. The condition of the exhaust gas sensor is determined based on the extracted frequency response.

15 Claims, 11 Drawing Sheets

ECU 200

3HZ = DETECTING SIGNAL FREQUENCY fid

EXAMPLE OF FREQUENCY PROPERTY OF BANDPASS FILTER

EXTRACTION OF DETECTING SIGNAL fid (a) NORMAL (b) ABNORMAL

CALCULATION OF LAF SENSOR RESPONSIVENESS PARAETER LAF_DLYP

CALCULATION OF LAF SENSOR RESPONSIVENESS PARAMETER
LAF_AF (SMOOTHED VALUE OF KACT_FA)

DIAGNOSTIC APPARATUS FOR AN EXHAUST GAS SENSOR

BACKGROUND OF THE INVENTION

This invention relates to a diagnostic device for detecting a degradation failure of an exhaust gas sensor disposed in an exhaust gas pipe of an internal-combustion engine.

An exhaust gas sensor is generally disposed in an exhaust gas pipe of an internal-combustion engine of a vehicle in order to measure components of exhaust gas. The exhaust gas sensor outputs an air-fuel ratio of the exhaust gas. Based on this output value, a control unit of the internal-combustion engine controls a stoichiometric air-fuel ratio of fuel to be supplied to the internal-combustion engine. Therefore, when the exhaust gas sensor cannot indicate a correct air-fuel ratio due to its degradation failure, the control unit cannot perform a correct control of the stoichiometric air-fuel ratio upon the internal-combustion engine.

There are disclosed some techniques for detecting a degradation failure of such exhaust gas sensor. The Japanese Patent Application Unexamined Publication (Kokai) No. HEI 7-145751 and U.S. Pat. No. 5,325,711 disclose a technique for producing a fuel signal having a modulated rectangle waveform, detecting exhaust gas by an oxygen sensor and processing this output signal so as to determine an operating condition of the oxygen sensor.

However, the above-referenced technique uses a modulated air-fuel signal having a modulated rectangle waveform and a composite output corresponding to an oxygen level of the exhaust gas based on the modulated signal. A response, which is output upon the input of the modulated rectangle waveform containing various frequency components, tends to be influenced by noises. Furthermore, because the signal that responds to the oxygen level of the exhaust gas is influenced by an operating condition of the internal-combustion engine, in particular, an air-fuel ratio variation that may be produced during an excessive operation, it is difficult to keep the frequency of the composite output signal at a constant level. Therefore, when the sensor condition is evaluated by these outputs, evaluation precision may deteriorate. On the other hand, precision of the air-fuel ratio control is getting more important than before because of an enhanced emission control and the need for decreasing the amount of precious metals in the catalyst. Accordingly, in order to suppress an increase of the exhaust gas components due to the characteristic degradation failure of the exhaust gas sensor, it is required to improve the detection precision more than before and it is also required to suppress the increase of the exhaust gas components during the degradation detection process.

Thus, it is an objective of the present invention to provide a failure diagnostic device for an exhaust gas sensor, which enables a further improvement of precision of detecting a deterioration failure of the exhaust gas sensor as well as a minimization of an increase of exhaust gas components during a degradation detection process.

SUMMARY OF THE INVENTION

In order to resolve the above-described problem, the present invention provides a deterioration failure diagnostic device for an exhaust gas sensor that is disposed in an exhaust gas pipe of an internal-combustion engine and produce an output responsive to components of exhaust gas from the internal-combustion engine. The device has detecting signal producing means for producing a detecting signal and multiplying the produced signal to a basic fuel injection amount used at a normal operation time so as to calculate a fuel injection amount to be used for determining a condition of the exhaust gas sensor and exhaust gas sensor evaluating means for extracting a frequency response corresponding to the detecting signal from an output of the exhaust gas sensor of the internal-combustion engine, the output being in response to the calculated fuel injection amount, so as to determine the condition of the exhaust gas sensor based on the extracted frequency response. According to this invention, instead of using the composite signal corresponding to the modulated rectangle waveform and the exhaust gas level, the fuel amount multiplied by the detecting signal having a given frequency is supplied, so that it is possible to keep the ratio of the detecting frequency components contained in the exhaust gas at a higher level. Besides, in such situation, the condition of the exhaust gas sensor can be diagnosed based on the frequency response in the above-described frequency of the output of the exhaust gas sensor, so that it is possible to easily decrease the ratio of the noise elements contained in the exhaust gas and it is also possible to improve the detection precision of the deterioration failure of the exhaust gas sensor.

According to one aspect of the invention, the detecting signal to be multiplied to the basic fuel injection amount is a signal obtained by adding either a sine wave or a cosine wave or a trigonometric wave to a given offset value. According to this aspect of the invention, it is possible to use the signal that can be easily produced so as to have a sufficient ratio of the frequency components for the detection and it is also possible to use the response of the certain frequency of the exhaust gas sensor for the evaluation purpose while maintaining the magnitude of frequency components of the detecting signal in the exhaust gas, so that the detection precision of the deterioration failure of the exhaust gas sensor can be improved.

According to another aspect of the invention, the detecting signal to be multiplied to the basic fuel injection amount is a signal obtained by adding a composite wave formed by two or more trigonometric function waves to a given offset value. According to this aspect of the invention, it is possible to use at least two frequency responses for determining the condition of the exhaust gas sensor by providing a composite wave formed by at least two trigonometric function waves having different frequencies, in particular, in such operating range that is difficult to detect. Besides, the trigonometric function wave can be composed to form a desired, particular waveform so that the condition of the exhaust gas sensor can be easily determined. Such composed wave is reflected in the fuel injection amount. Accordingly, the detection precision of the deterioration failure of the exhaust gas sensor can be further improved.

According to a further aspect of the invention, the exhaust gas sensor evaluating means determines the condition of the exhaust gas sensor when a given time is elapsed since the fuel injection amount multiplied by the detecting signal has been supplied to the engine. According to this aspect of the invention, the determination of the exhaust gas sensor condition can be performed stably by avoiding such unstable state of the exhaust gas air-fuel ratio that may appear at the time immediately after the detecting signal has been reflected on the fuel. Accordingly, the detection precision of the deterioration failure of the exhaust gas sensor can be further improved.

According to yet further aspect of the invention, the exhaust gas sensor evaluating means determines the condition of the exhaust gas sensor by using an output from the exhaust gas sensor after having applied a bandpass filtering on the output. According to this aspect of the invention, the frequency components, which are contained in the exhaust gas, except for the detecting frequency, are removed when the condition of the exhaust gas sensor is determined because those frequencies are noises. Accordingly, the detection precision of the deterioration failure of the exhaust gas sensor can be further improved.

According to yet further aspect of the invention, the exhaust gas sensor evaluating means determines that the exhaust gas sensor is in failure when an integrated value obtained by integrating absolute values of the bandpass-filtered outputs from the exhaust gas sensor is smaller than a given value. According to yet further aspect of the invention, the exhaust gas sensor evaluating means determines that the exhaust gas sensor is in failure when a value obtained by a calculation of smoothing absolute values of the bandpass-filtered outputs from the exhaust gas sensor is smaller than a given value. Since the variation in the outputs from the exhaust gas sensor can be thus averaged according to these aspects of the invention, the detection precision of the deterioration failure of the exhaust gas sensor can be further improved.

According to yet further aspect of the invention, the exhaust gas sensor is a wide-range air-fuel ratio sensor.

According to yet further aspect of the invention, the deterioration failure diagnostic device additionally has air-fuel ratio controlling means for controlling an air-fuel ratio to be supplied to the internal-combustion engine so as to converge the air-fuel ratio to a predetermined value based on the output of the exhaust gas sensor. The fuel injection amount is corrected in accordance with a feedback coefficient that is determined based on the output of the exhaust gas sensor. According to this aspect of the invention, the fuel injection amount is corrected such that a drift toward rich or lean which is caused by applying the detecting signal to the fuel injection amount can be suppressed. As a result, it is possible to suppress the decrease of the catalyst purification rate that may occur due to the detection method of the present invention so as to maintain the detection precision while preventing the increase of the emitted amount of the harmful constituents contained in the exhaust gas.

According to yet further aspect of the invention, the feedback coefficient is determined based on an output of either an exhaust gas sensor disposed upstream of a catalytic converter or an exhaust gas sensor disposed downstream of the catalytic converter or outputs from both of the exhaust gas sensors disposed upstream and downstream of the catalytic converter. According to this aspect of the invention, the fuel injection amount is corrected such that a drift toward rich or lean which is caused by applying the detecting signal to the fuel injection amount can be suppressed. As a result, it is possible to suppress the decrease of the catalyst purification rate that may occur due to the detection method of the present invention so as to maintain the detection precision while preventing the increase of the emitted amount of the harmful constituents contained in the exhaust gas.

According to yet further aspect of the invention, the air-fuel ratio controlling means suspends the control of the air-fuel ratio or slows down a feedback speed when supplying the fuel injection amount multiplied by the detecting signal to the internal-combustion engine. According to this aspect of the invention, since such situation can be avoided that the feedback coefficient includes the particular detecting frequency, the degradation of the detection precision can be prevented even when the feedback is combined.

Thus, according to the present invention, the fuel that is multiplied by the detecting signal containing specific frequency components more is supplied and then the condition of the exhaust gas sensor is diagnosed based on the frequency response in the detecting signal of the output of the exhaust gas sensor. Accordingly, the noise elements can be eliminated in accordance with the characteristic of the detecting signal, so that the detection precision for the deterioration failure of the exhaust gas sensor can be improved.

BRIEF DESCRIPTION OF THE DRAWINGS

FIG. 11 shows a flowchart of one embodiment of the present invention including a method for suspending a feedback operation and the like.

DESCRIPTION OF THE PREFERRED EMBODIMENTS

1. Description of Functional Blocks

Figure 1:
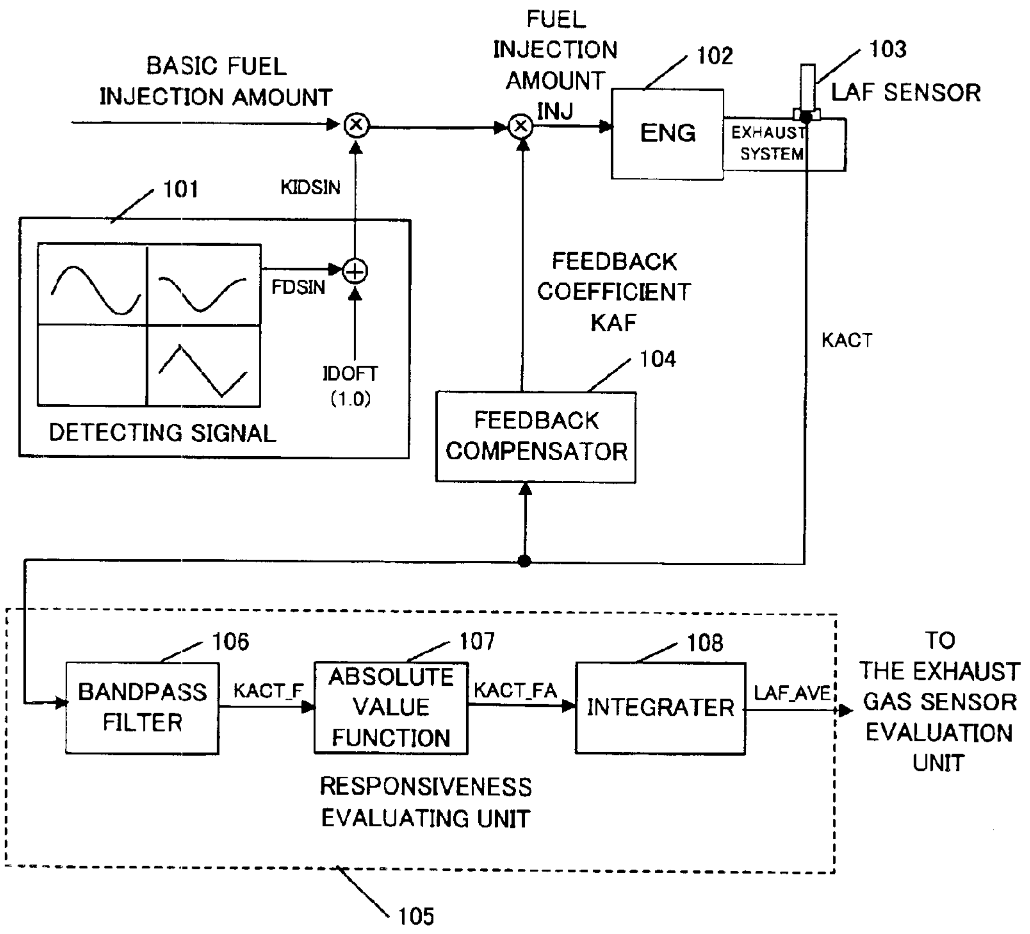
FIG. 1 is a schematic diagram showing an exhaust gas sensor failure diagnostic device according to one embodiment of the present invention.

Each functional block will be described with reference to FIG. 1 and FIG. 2. FIG. 1 is a schematic diagram of an overall structure for describing a concept of the present invention.

A detecting signal producing unit 10 has a function of producing a given, detecting signal KIDSIN in which a trigonometric function wave FDSIN or the like is superimposed on an offset value IDOFT. A responsiveness evaluating unit 105 performs band-pass filtering of KACT, output from a linear air-fuel ratio sensor (hereinafter referred to as an LAF sensor) 103. KACT is an equivalent ratio proportional to the fuel-air ratio F/A and takes a value of 1.0 for the stoichiometric air-fuel ratio. The unit 105 converts the filtered value to an absolute value, integrates the converted values over a given time period and transmits the integrated value to an exhaust gas sensor evaluating unit. The exhaust gas sensor evaluating unit determines degradation failure of the exhaust gas sensor based on the transmitted value. Since the exhaust gas sensor evaluating unit, the detecting signal producing unit 101 and the responsiveness evaluating unit 105 can be implemented in an ECU (electronic control unit), the operation of each unit will be described in detail later in association with description of the ECU and a diagnosis process for a failure of the exhaust gas sensor.

An internal-combustion engine 102 is an engine in which a fuel injection amount can be controlled by an injection controller based on a value from a fuel injection amount calculating unit.

The LAF sensor 103 (a wide-range air-fuel ratio sensor) is such sensor that detects an air-fuel ratio extending over a wide range from rich to lean upon the exhaust gas discharged from the engine 102 to produce an equivalent ratio KACT.

A feedback compensation unit 104 produces a feedback factor KAF so as to keep the air-fuel ratio at an appropriate level based on the output value from the LAF sensor 103.

Figure 2:
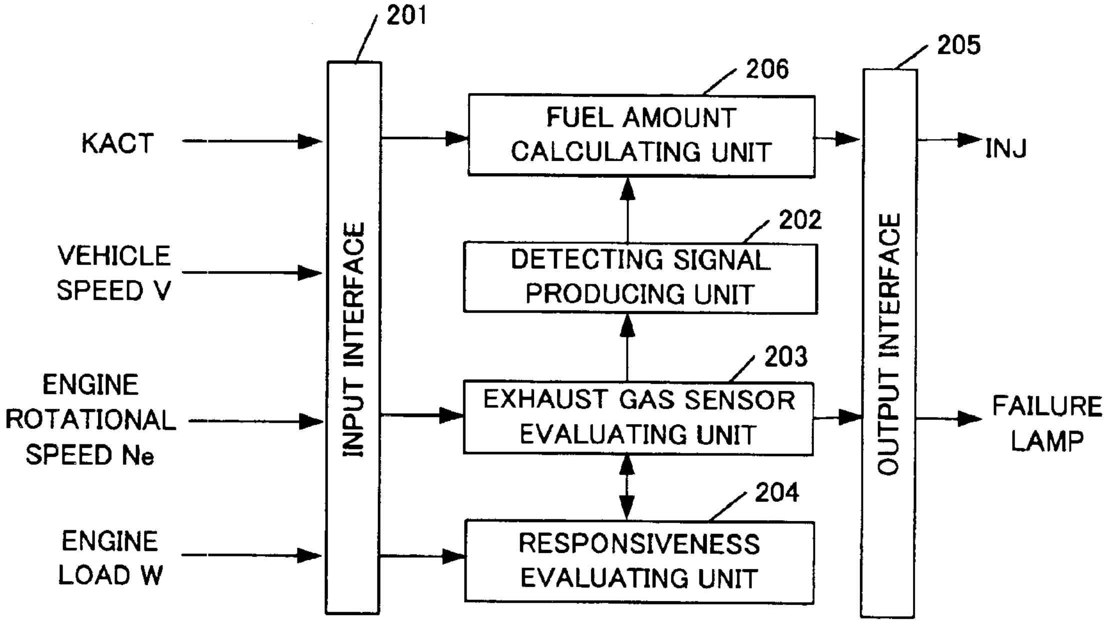
FIG. 2 shows an example of an ECU to be used in an exhaust gas sensor failure diagnostic device according to one embodiment of the present invention.
Figure 3:
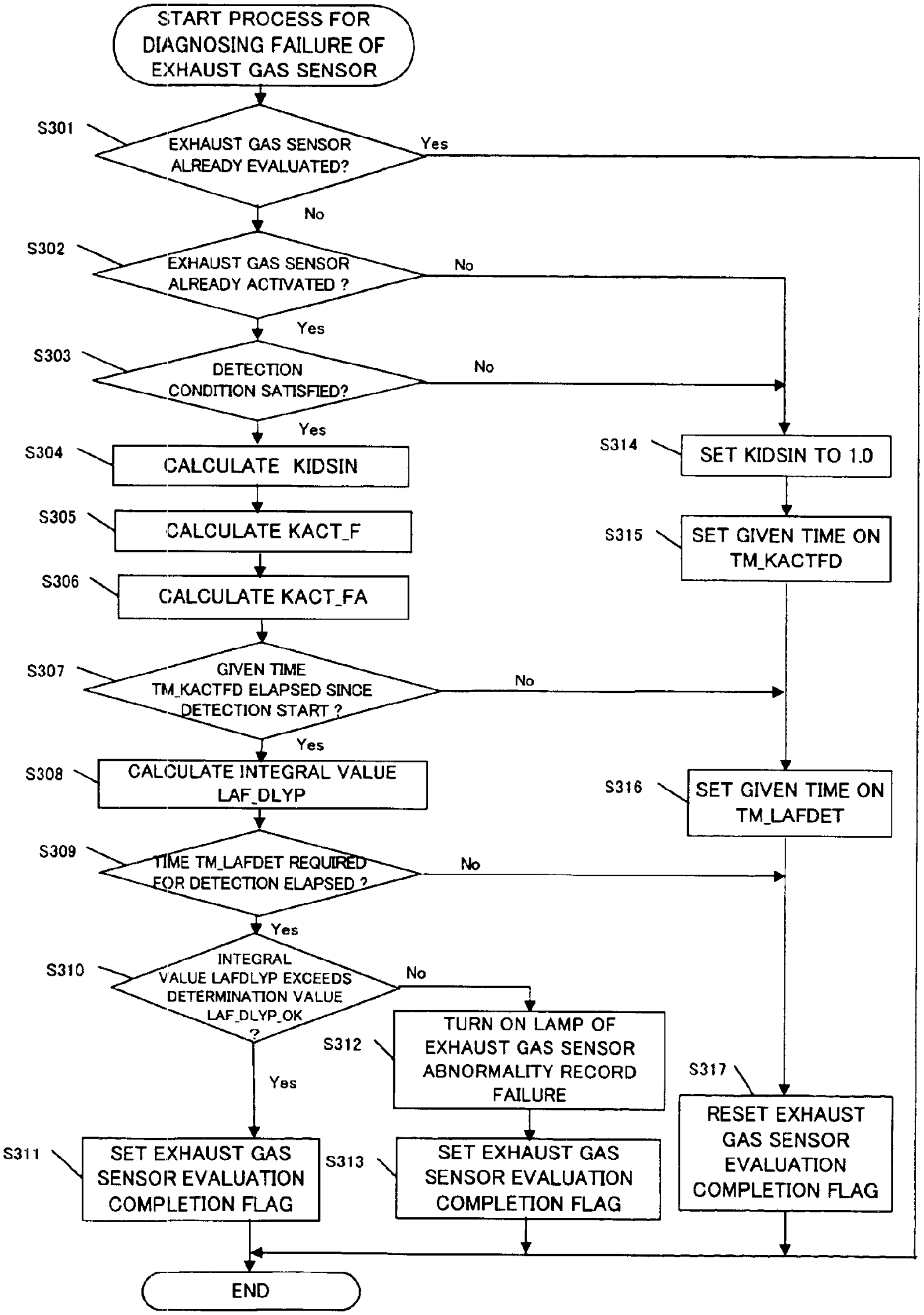
FIG. 3 shows a flowchart of one embodiment of the present invention.

The above-described functions of the exhaust gas sensor evaluating unit, the detecting signal producing unit 101 and the responsiveness evaluating unit105 can be implemented by the ECU as shown in FIG. 2. FIG. 2 schematically shows an overall structure of an electronic control unit (ECU) 200. In this embodiment, although the ECU may be provided as a controller dedicated for diagnosing the failure of the exhaust gas sensor, the functions of the exhaust gas sensor evaluating unit 203, the detecting signal producing unit 202 and the responsiveness evaluating unit 204 are integrated into the ECU that controls the engine system. The ECU 200 is provided with a processor for performing various computations, a Random Access Memory (RAM) for providing storage areas for temporally storing various data and a working space for the computations by the processor, a Read-Only Memory (ROM) for pre-storing programs to be executed by the processor and various data required for the computations and a re-writable non-volatile memory for storing computation results by the processor and the data to be stored among the data obtained from each section of the vehicle. The non-volatile memory can be implemented with a RAM with a backup capability to which voltage is always supplied even after suspension of the system.

An input interface 201 is an interface of the ECU 200 and various parts of the engine system. The input interface 201 receives information, indicating operating conditions of the vehicle transmitted from various parts of the engine system, performs a signal processing, converts analog information to digital signals and then delivers those signals to the exhaust gas sensor evaluating unit 203, the fuel amount calculating unit 206 and the responsiveness evaluating unit 204. Although the KACT value, output from the LAF sensor 103, a vehicle speed V, an engine rotational speed Ne and an engine load W are shown as inputs to the input interface 201 in FIG. 2, the inputs are not limited to those values, but any other various information may be input.

The unit for producing a detecting signal 202 produces a signal KIDSIN to be used for detection. The signal is produced by adding a trigonometric function wave FDSIN or the like to an offset value IDOFT based on a command from the exhaust gas sensor evaluating unit 203. This detecting signal KIDSIN will be described later in association with a process for diagnosing an exhaust gas sensor failure.

The exhaust gas sensor evaluating unit 203 performs a necessary calculation and determination of the condition for executing a process (which will be described later) for diagnosing the exhaust gas sensor failure based on the data delivered from the input interface 201.

The evaluating unit 203 also controls the detecting signal producing unit 202 and a responsiveness evaluating unit 204. In response to a command from the exhaust gas sensor evaluating unit 203, the responsiveness evaluating unit 204 performs a bandpass filtering upon the output KACT from the LAF sensor 103, converts the filtered value to the absolute value and then integrates the converted values over a given time period. These functions will be described later in association with the process for diagnosing the exhaust gas sensor failure.

The fuel amount calculating unit 206 receives the detecting signal KIDSIN produced by the detecting signal producing unit 202, multiplying the detecting signal to the fuel amount and providing the resulted fuel injection amount INJ to the output interface 205. The output interface 205 outputs the fuel injection amount INJ to an injection function of the internal-combustion engine. The output interface 205 receives a control signal from the exhaust gas sensor evaluating unit 203 and provides an output to a failure indicating lamp. However, the functions of the output interface 205 are not limited to these ones, but any other controller or the like can be connected to the output interface 205.

2. Description of a Process for Diagnosing an Exhaust Gas Sensor Failure

Description will now be made of an exhaust gas sensor failure diagnosis process for diagnosing a degradation failure of the LAF sensor 103 that is an exhaust gas sensor.

When the exhaust gas sensor failure diagnosis process is invoked from a main program, the exhaust gas sensor evaluating unit 203 checks an exhaust gas sensor evaluation completion flag to determine whether or not a deterioration failure of the exhaust gas sensor has been already evaluated. Initially, since the evaluation upon the exhaust gas sensor is not performed yet, the exhaust gas sensor evaluation completion flag is set to 0, so the process proceeds to step S302. The exhaust gas sensor evaluating unit 203 determines whether or not the LAF sensor has been already activated (S302). When the time elapsed after the engine started is short, the LAF sensor is not activated. Therefore, when the time elapsed after the engine started does not reach a predetermined time interval, the process proceeds to step S314. In step S314, the exhaust gas sensor evaluating unit 203 sends a command to the detecting signal producing unit 202 to set an IDOFT to a constant value of 1.0 and an FDSIN to a constant value of 0 and produce a composite signal KIDSIN that is a sum of the IDOFT and the FDSIN (accordingly the KIDSIN is initially 1.0). The KIDSIN represents a coefficient that is multiplied to a basic fuel injection amount to produce a fuel injection amount to be actually injected. Accordingly, when the KIDSIN is 1.0, the basic fuel injection amount for the normal operation time is injected. After having sent the command to the unit for producing a detecting signal 202, the exhaust gas sensor evaluating unit 203 sets a given time on a timer TM_KACTFD to start a countdown of the timer TM_KACTFD (S315). The given time to be set on the TM_KACTFD is the duration from the time a condition for the exhaust gas sensor evaluation is satisfied (as will be described later) and the fuel injection reflecting the detecting signal has started to the time the engine stably responds to the fuel injection that reflects the detecting signal. Thus, the timer is set such that an integral operation (which will be described later) starts when the predetermined time has elapsed. This way, response is be evaluated avoiding unstable output state just after the detection signal has been reflected to the fuel injection amount. Thus, the detection accuracy is be enhanced.

After TM_KACTFD is set to the timer, the exhaust gas sensor evaluating unit 203 sets a predetermined time to a timer TM_LAFDET to start countdown of the timer TM_LAFDET. The predetermined time to be set on the timer TM_LAFDET is a duration time for performing the integral operation upon the absolute values (which will be output in a later stage). The result of the integral operation is to be used to determine deterioration failure of the exhaust gas sensor. After setting the timer TM__LAFDET, the exhaust gas sensor evaluating unit 203 sets the exhaust gas sensor evaluation completion flag to 0 and then terminates this process.

After the above-described process has been completed, the exhaust gas sensor failure diagnosis process is invoked again from the main program. At this time, the exhaust gas sensor evaluation completion flag is reset by the previous process. Then, as the exhaust gas sensor becomes activated when the predetermined time after the engine start is elapsed, the process proceeds from S301 to S303, in which the exhaust gas sensor evaluating unit 203 determines whether or not the detection condition is satisfied. The detection condition represents such state that the vehicle speed, the engine rotational speed and the engine load are within respective predetermined ranges. Therefore, the exhaust gas sensor evaluating unit 203 receives the vehicle speed V, the engine rotational speed Ne and the engine load W through the input interface 201 to determine whether or not all of these factors are within the respective predetermined ranges. When this condition is not satisfied, the exhaust gas sensor evaluating unit 203 proceeds the process to Step S314. The operations in Step S314 and in the subsequent steps are all same as described above.

On the other hand, when the above-described detection condition is satisfied, the exhaust gas sensor evaluating unit 203 sends a request for calculating a KACT__FA to the detecting signal producing unit 202. Upon receiving the KACT__FA calculation request, the detecting signal producing unit 202 first produces a sine wave IDSIN with a frequency fid (3 Hz is used in this example) and an amplitude aid (0.03 in this example) and then adds an offset value (1.0 in this example) to the above-produced sine wave IDSIN so as to obtain a KIDSIN (namely, 1.0+0.03*sin 6πt) in Step S304. This value KIDSIN is continuously transmitted to the fuel amount calculating unit 206. Upon receiving the KIDSIN, the fuel amount calculating unit 206 multiplies the KIDSIN by the basic fuel injection amount to obtain a fuel injection amount INJ. This fuel injection amount INJ is input to the injection function of the engine 102 through the output interface 205. As the engine is operated in accordance with such fuel injection amount INJ, the exhaust gas, which is an output corresponding to the fuel injection amount as an input, is emitted from an exhaust system of the engine. Then, the LAF sensor 103 detects the emitted exhaust gas and inputs its output KACT to the responsiveness evaluating unit 204 through the input interface 201. The responsiveness evaluating unit 204 substitutes the KACT into the following equation in order to calculate a bandpass-filtered output KACT__F (S305).

KACT__F(k)=a1 KACT__F(k−1)+a2 KACT__F(k−2)+a3 KACT__F(k−3)+b0 KACT(k)+b1 KACT(k−1)+b2 KACT(k−2)+b3 KACT(k−3)

where a1,a2,a3,b0,b1,b2,b3 are filtering coefficients.

Figure 4:
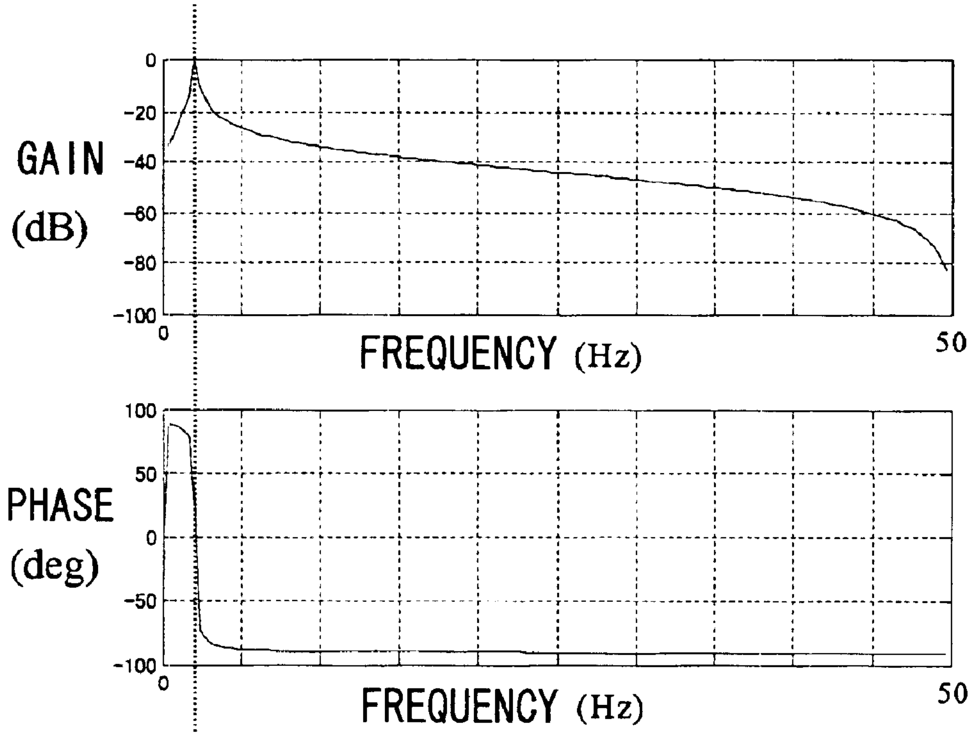
FIG. 4 schematically shows exemplary characteristics of a bandpass filter frequency used in the present invention.

The band-pass filter used in this embodiment is designed to pass a frequency component of 3 Hz that is the same frequency as that of the detecting signal shown in FIG. 4.

Figure 5:
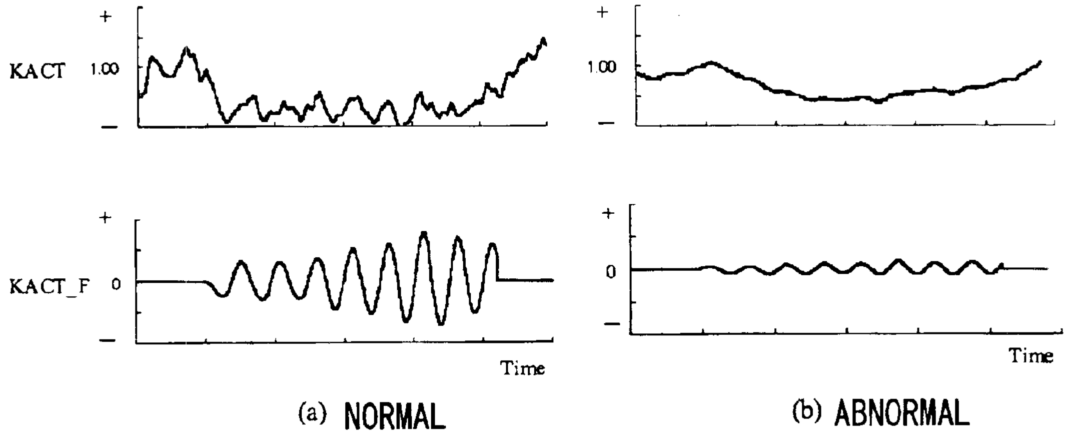
FIG. 5 schematically shows an example of extraction of a detecting frequency fid.

After having calculated the KACT__F value (as shown in FIG. 5), the responsiveness evaluating unit 204 calculates an absolute value KAT__FA from the KACT__F (S306).

Figure 6:
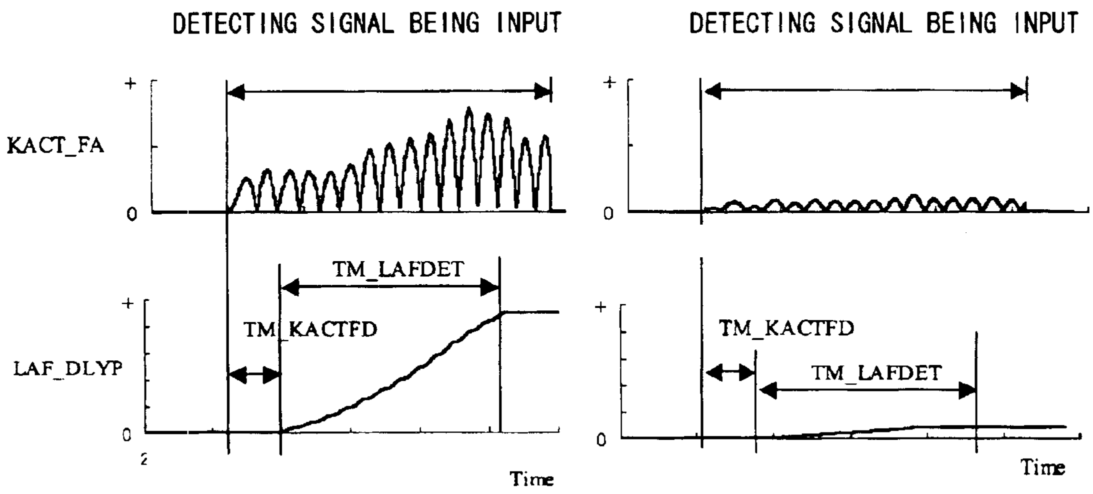
FIG. 6 schematically shows an example of calculation of a LAF sensor responsiveness parameter LAF_DLYP.

Upon completion of calculation of KACT__FA in the responsiveness evaluating unit 204, the exhaust gas sensor evaluating unit 203 determines whether or not the timer TM__KACTFD is 0 (S307). When the timer TM__KACTFD is not 0, the process proceeds to S316. Operations in Step S316 and the subsequent steps are the same as described above. On the other hand, when the timer TM__KACTED is 0, the exhaust gas sensor evaluating unit 203 informs the responsiveness evaluating unit 204 that the timer condition is satisfied. Upon such information, the responsiveness evaluating unit 204 calculates the integrated value LAF__DLYP continuously (S308). FIG. 6 shows an example of calculation of LAF__DLYP relative to the continuous time in a horizontal axis.

Upon completion of the calculation of LAF__DLYP in the responsiveness evaluating unit 204, the exhaust gas sensor evaluating unit 203 determines whether or not the timer TM__LAFDET is 0. When the timer TM__LAFDET is not 0, the process proceeds to Step S317. Operations in Step S317 and in the subsequent steps are same as above described. On the other hand, when the timer TM__LAFDET is 0, the current value of the calculated integrated values LAF__DLYP is transmitted to the exhaust gas sensor evaluating unit 203 and the process proceeds to Ste S310. In Step S310, the exhaust gas sensor evaluating unit 203 determines whether or not the integrated value LAF__DLYP exceeds a predetermined value LAF__DLYP__OK. The LAF__DLYP__OK value is a threshold value for determining whether or not the exhaust gas sensor fails due to deterioration based on the integrated value LAF__DLYP.

When the integrated value LAF__DLYP exceeds the determination value LAF__DLYP__OK, the exhaust gas sensor evaluating unit 203 determines that the exhaust gas sensor is not in failure caused by deterioration, sets the exhaust gas sensor evaluation completion flag to 1 (S311) and then terminates this process.

On the other hand, when the integrated value LAF__DLYP does not exceed the determination value LAF__DLYP__OK, the exhaust gas sensor evaluating unit 203 determines that the exhaust gas sensor fails due to deterioration, turns on an exhaust gas sensor abnormality record failure lamp through the output interface 205 (S312), then sets the exhaust gas sensor evaluation completion flag to 1 (S313) and exits from this process.

Figure 7:
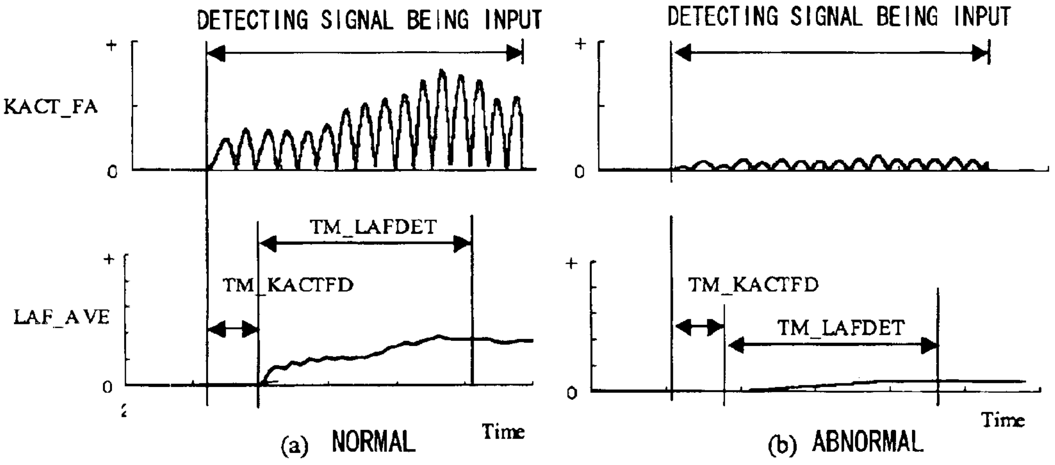
FIG. 7 schematically shows an example of calculation of a LAF sensor responsiveness parameter LAF_AVE.

As an alternative method for determining the degradation failure, in Step S308, rather than determining the degradation failure of the exhaust gas sensor based on the integrated value LAF__DLYP, a smoothing calculation is performed as shown in FIG. 7 in which a moving average for the KACT__FA values is calculated, and then the deterioration failure of the exhaust gas sensor may be determined based on such smoothed value AF__AVE. In this case, in Step S310, the exhaust gas sensor evaluating unit 203 determines whether or not the smoothed value LAF__AVE exceeds the determination value LAF__AVE__OK. When the smoothed value LAF__AVE does not exceed the determination value LAF__DLYP__OK, the exhaust gas sensor evaluating unit 203 determines that the exhaust gas sensor is in failure due to deterioration. On the other hand, when the value LAF__AVE exceeds the determination value LAF__DLYP__OK, the exhaust gas sensor evaluating unit 203 determines that the exhaust gas sensor is not in failure due to deterioration.

According to the present invention, the engine is given the fuel injection amount that is multiplied by the detecting signal such as a sine wave variation to be used for evaluating the exhaust gas sensor, and then the responsiveness of the exhaust gas sensor is evaluated based on the subsequent outputs from the exhaust gas sensor. Thus, since such composite output as corresponding to the exhaust gas oxygen level is not used, it is possible to obtain an exhaust gas sensor output that contains highly constant frequency components, and it is also possible to improve the determination precision when the condition of the exhaust gas sensor is determined by using the frequency response characteristic.

Furthermore, noise elements can be eliminated at the time of the sensor measurement by using the bandpass-filtered outputs so as to remove frequency components except for the frequency to be used for the detection. Accordingly, it is possible to eliminate the influence of the other frequency components caused by the air-fuel ratio variation or the like that may occur in particular at the time of the transient operation. As a result, the detection precision can be improved.

Besides, because the deterioration failure of the exhaust gas sensor is determined based on the smoothing value including the average value or the integrated value over the predetermined time period for the absolute values of the bandpass-filtered output waves, the influence of an eruptive spike of air-fuel ratio or the like caused by the engine load variation or the like can be removed from the evaluation for the detection of the exhaust gas sensor deterioration, so that the precision of the deterioration failure determination can be further improved.

3. Use of a Composite Wave

The sine wave is used as a detecting signal in the above-described embodiment. The same effect can be obtained by using either a trigonometric function wave of a single frequency or a trigonometric wave, or a composite wave including a plurality of these waves. In either case, when the detecting signal has a limitation in the amplitude, the spectrum components of the desired single frequency or the multiple frequencies can be expanded, so that the precision for detecting the noise can be enhanced.

Figure 8:
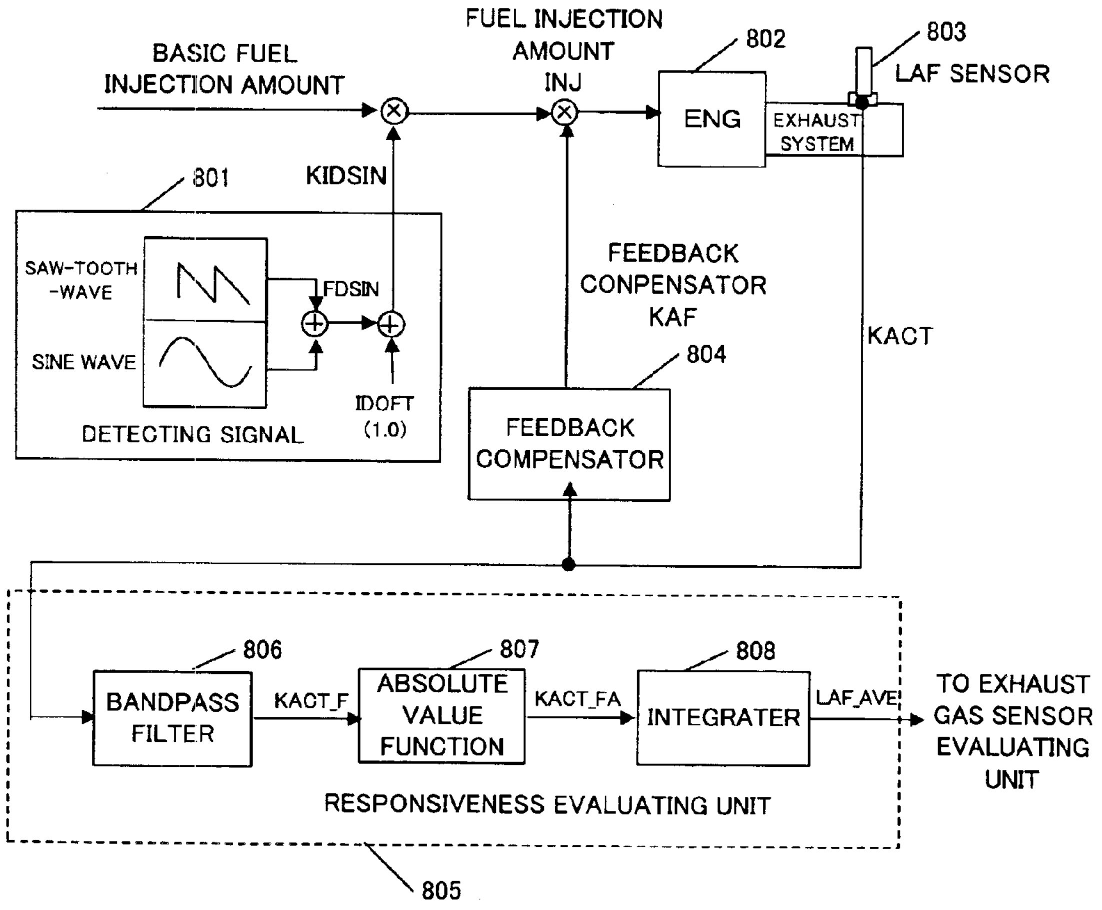
FIG. 8 is a schematic diagram showing an exhaust gas sensor failure diagnostic device when a composite wave is used.

For example, there exists a fuel deposit delay in an air intake system of the engine. In particular, this delay becomes significant, for example, when the temperature is low, or when gasoline that contains heavy components in vapor as sold in the North America is used. Although there is a technique for correcting such fuel deposit delay, a complete correction cannot be easily obtained. For example, with control parameters that are set for the normal gasoline, the correction becomes insufficient in case where those parameters are applied to the gasoline containing heavy elements. In such case, there occurs such phenomenon as an unfavorable rise in the wave-form of the actual air-fuel ratio relative to the wave-form of the command value of the air-fuel ratio. In such case, if the technique of the present invention is applied, the amplitude of the actual air-fuel ratio may become smaller than presumed, and accordingly the detection precision may deteriorate. Therefore, the trigonometric function wave is provided in order to obtain a wave-form that is capable to mitigate the decrease of the amplitude of the real air-fuel ratio caused by the fuel deposit. FIG. 8 shows one embodiment using a composite wave formed by a basic sine wave and a saw-tooth-wave.

Figure 9:
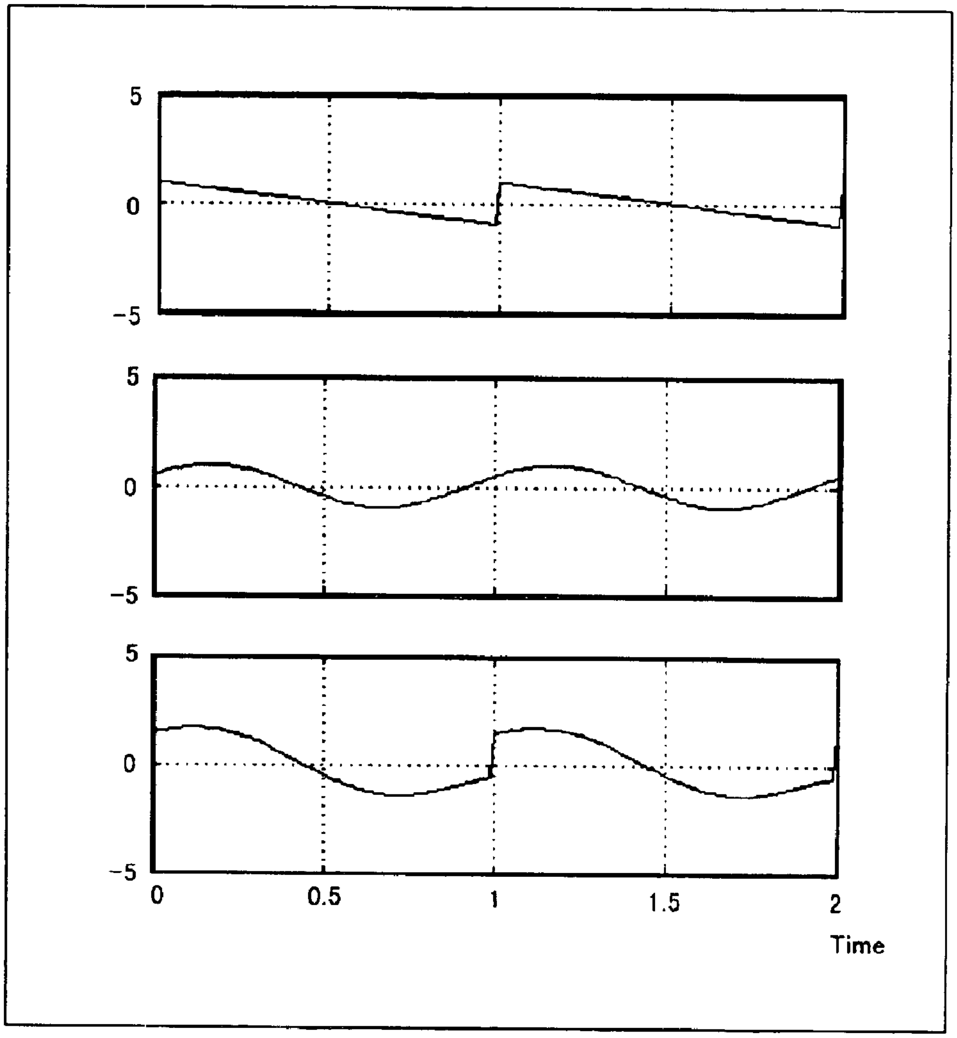
FIG. 9 shows examples of input composite waves.

As can be seen from the waves in FIG. 9, a composite wave is formed to be in phase with the amplitude of the saw-tooth-wave that increases stepwise in accordance with the timing for changing the fuel amount toward an increasing direction. By using this composite wave, it is possible to correct an amount of the fuel deposit when the fuel amount increases. In such a way, the decrease of the actual air-fuel ratio can be reduced to prevent the decrease of precision in the deterioration detection for the exhaust gas sensor. In this embodiment, the composite wave formed by a sine wave and a saw-tooth-wave is used. However, if a desired wave form can be obtained by any composite wave that may be formed by combining any trigonometric function waves such as a dynamic correction wave form that is matched with the deposit characteristic of the engine, it may be more efficient.

4. Use of Feedback

Figure 10:
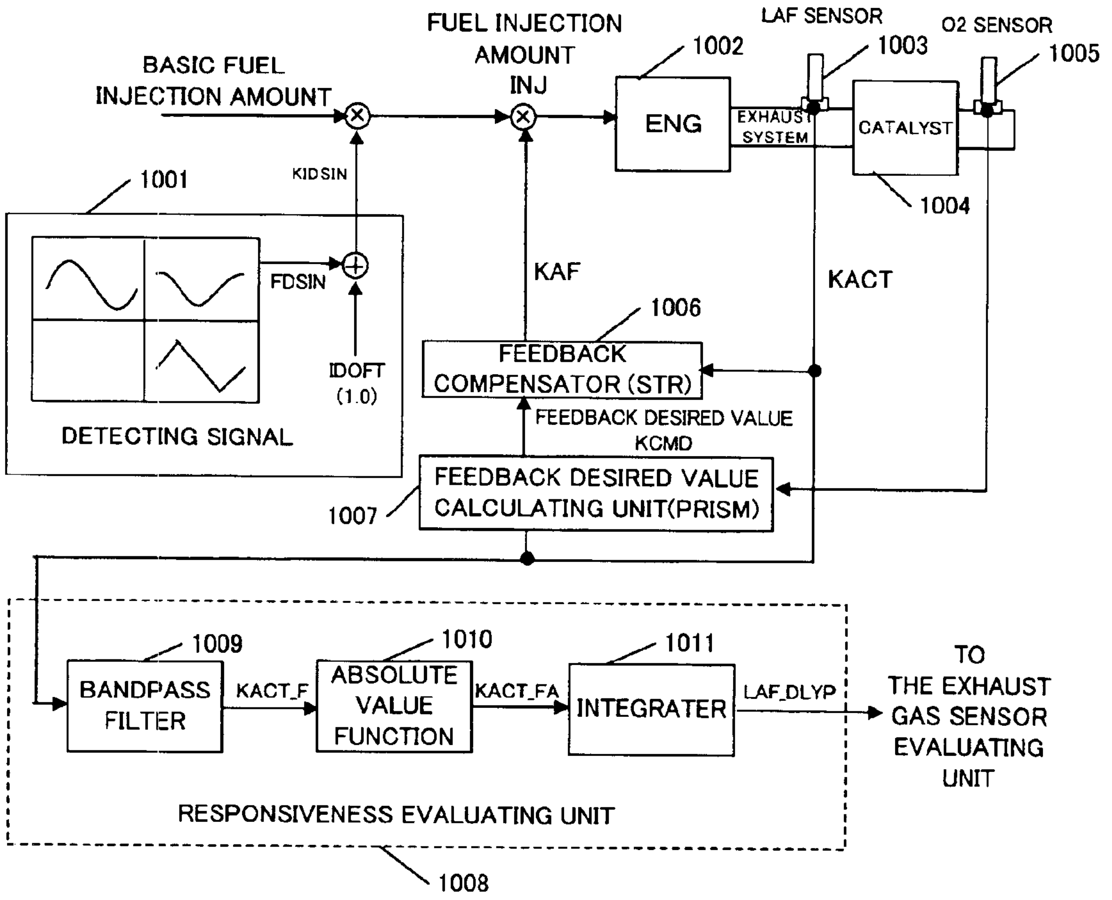
FIG. 10 is a schematic diagram showing an exhaust gas sensor failure diagnostic device when another method for calculating a feedback coefficient is used.

Optionally, a feedback control may be introduced in the process for determining the fuel injection amount, as shown in FIG. 1, FIG. 8 and FIG. 10. More specifically, the value KACT is input to a feedback compensator in order to calculate a feedback coefficient KAF for converging the air-fuel ratio (supplied to the engine) onto a predetermined value. Then, the result of the multiplication of the basic fuel injection amount by the KIDSIN value is further multiplied by this feedback coefficient KAF, so that a feedback is performed upon the actual fuel injection amount. As for this feedback control case, in the embodiment using the ECU, the feedback compensator (not shown) is structured to connect to the fuel amount calculating unit 206.

According to an embodiment of the present invention, the fuel injection amount is corrected based on the feedback coefficient that is determined based on either the output of the exhaust gas sensor disposed upstream of the catalyst or the output of the exhaust gas sensor disposed downstream of the catalyst or the outputs of both sensors. Drift toward rich or lean caused when the detecting signal is applied to the fuel injection amount can be suppressed, preventing the decrease of the catalyst purification rate during the degradation failure diagnostic process for the exhaust gas sensor, which prevents the increase of the emitted amount of the harmful components contained in the exhaust gas.

Figure 11:
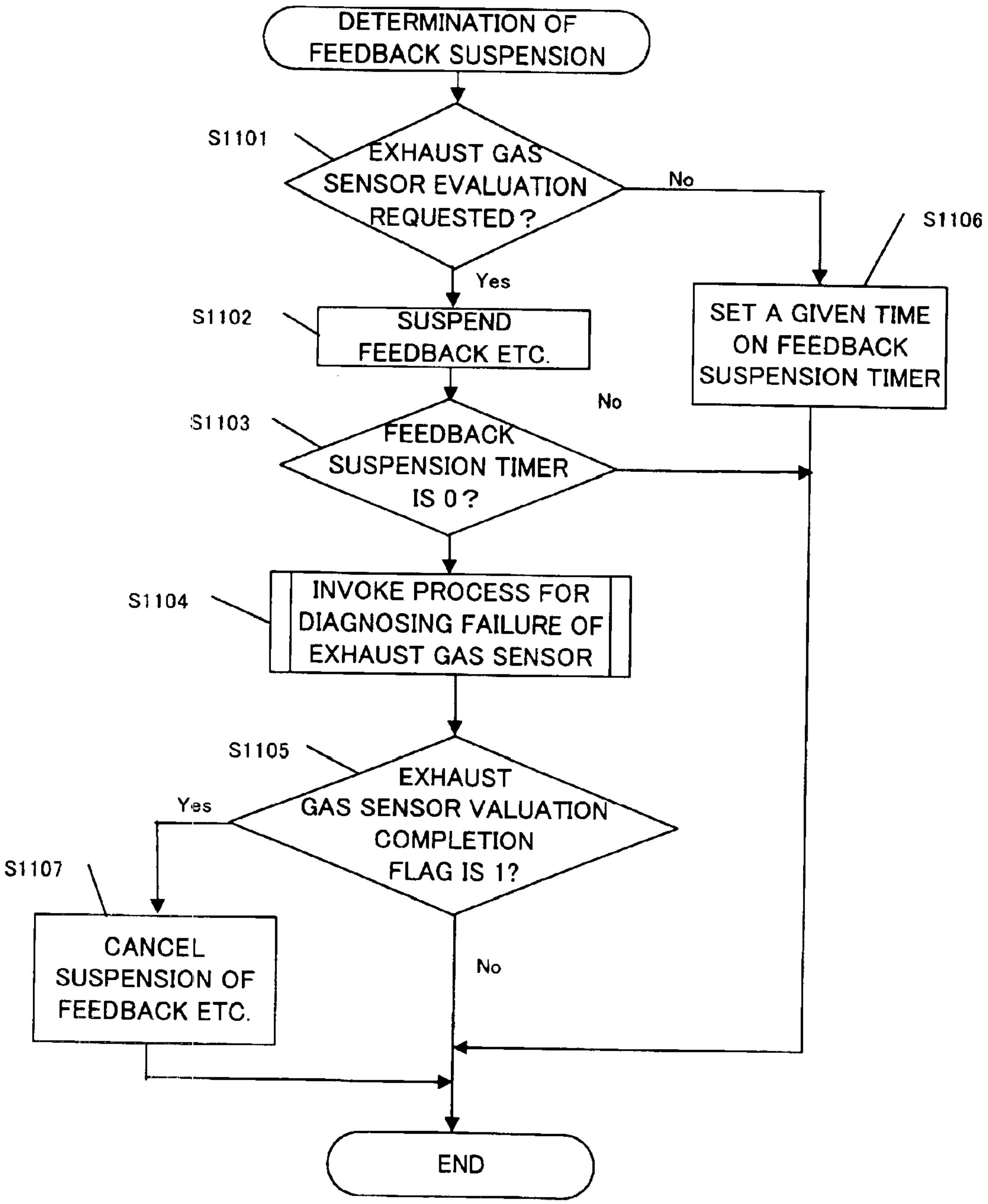

In the above-described feedback control, the combination with the usual LAF sensor feedback is described. However, in case where the desired value and/or the correction coefficient in the feedback system includes the frequency components in the neighborhood of the same frequency "fid" as the frequency of the detecting signal, the detection precision of the output response may sometimes deteriorate. A countermeasure against this problem is to suspend the air-fuel ratio feedback operation and/or the calculation of the desired value of air-fuel ratio feedback or to delay the response of the feedback determined based on the output of the exhaust gas sensor, during the execution of the exhaust gas sensor failure diagnostic process as shown in a feedback suspension determining process in FIG. 11. Thus, the feedback system does not include the frequencies in the neighborhood of "fid".

The process for determining the feedback suspension will be described. After the process for determining the feedback suspension is initially invoked from the main program, the process first checks an exhaust gas sensor evaluation request flag to determine whether or not the exhaust gas sensor evaluation is requested (S1101). When the evaluation is not requested, the exhaust gas sensor evaluating unit 203 proceeds the step to Sep S1106, in which a given time is set on a feedback suspension timer and the countdown is started. Then, this process is terminated.

When the feedback suspension determining process is invoked again, the exhaust gas sensor evaluating unit 203 determines again whether or not the exhaust gas sensor evaluation is requested (S1101). When the exhaust gas sensor evaluation request flag is set to 1, indicating that the evaluation is requested, the exhaust gas sensor evaluating unit 203 requests the feedback compensation unit to suspend the feedback (S1102). Then, in Step S1103, the exhaust gas sensor evaluating unit 203 determines whether or not the feedback suspension timer is 0. Currently, the predetermined time has not elapsed after the exhaust gas sensor evaluation request was issued, and accordingly the feedback suspension timer is not 0. So, the evaluation unit 203 terminates the process. On the other hand, when the feedback stop timer is 0, the exhaust gas sensor evaluating unit 203 invokes the feedback suspension determining process (S1104). When the invoked feedback suspension determining process is completed, the exhaust gas sensor evaluating unit 203 proceeds the process to Step S1105, in which the evaluation unit 203 checks the exhaust gas sensor evaluation completion flag that has been set or reset in the exhaust gas sensor failure diagnostic process, so as to determine whether or not the exhaust gas sensor failure diagnosis has been completed. When the exhaust gas sensor failure diagnosis is not completed, the process is exited here. On the other hand, when the exhaust gas sensor failure diagnosis has been completed, the exhaust gas sensor evaluating unit 203 proceeds the process to Step S1106, in which the evaluation unit 203 requests the feedback compensation unit to cancel the suspension of the feedback so as to re-start the correction of the fuel injection amount INJ through the feedback operation. Then, the process is terminated here.

Besides, in case where the exhaust gas sensors are disposed both downstream and upstream of a catalytic converter as shown in FIG. 10, the following methods (1) through (6) may be used as an alternative to the method in Step S1102.

(1) Suspend the feedback of the before-catalyst exhaust gas sensor (that is, the exhaust gas sensor disposed upstream of the catalytic converter). With this method, it is possible to prevent the same frequency components as the detecting frequency from being included in the feedback coefficient, which contributes to preventing deterioration of the detection precision.

(2) Suspend calculation of the feedback desired value for the after-catalyst exhaust gas sensor (that is, the exhaust gas sensor disposed downstream of the catalytic converter). With this method, it is possible to prevent the same frequency components as the detecting frequency from being included in the feedback desired value. As a result, it is not only possible to prevent such situation that the feedback coefficient utilizing the before-catalyst exhaust gas sensor may produce the detecting frequency in the course of following the desired value, but also it is possible to prevent drift of the air-fuel ratio and prevent increase of the exhaust gas components through the feedback utilizing the before-catalyst exhaust gas sensor.

(3) Perform both methods (1) and (2). With both suspension operations, not only the same effect as for the method (1) can be obtained but also it is possible to prevent a wasted consumption of the ECU operation power resource which is caused by continued calculation of the desired value on one side with suspension of the before-catalyst feedback on the other side.

(4) Slow down the variation speed of the feedback coefficient. The variation speed of the feedback coefficient can be slowed down by changing the parameters which are used to determine the feedback control speed for the before-catalyst exhaust gas sensor. With this method, since it is possible to prevent the same frequency components as the detecting frequency from being included in the feedback coefficient, the deterioration of the detection precision can be prevented. Besides, through the feedback operation utilizing the before-catalyst exhaust gas sensor, it is possible to prevent the drift of the air-fuel ratio better than when the feedback is suspended and it is also possible to suppress the increase of the exhaust gas constituents.

(5) To slow down the variation speed of the desired value. The variation speed of the desired value can be slowed down by changing the parameters which are used to determine the control speed for calculating the feedback desired value for the after-catalyst exhaust gas sensor. With this method, it is possible to prevent the same frequency components as the detecting frequency from being included in the desired value. Accordingly, it is possible to prevent such situation that the feedback coefficient utilizing the before-catalyst exhaust gas sensor may produce the detecting frequency in the course of following the desired value, so that the deterioration of the detection precision can be prevented. Besides, it is possible to prevent the increase of the exhaust gas constituents through the feedback utilizing the before-catalyst exhaust gas sensor.

(6) Slow down both control speeds of (4) and (5) by changing the parameters to be used to determine those control speeds. With this method, both effects of (4) and (5) can be obtained. Specifically, since it is possible to prevent the same frequency components as the detecting frequency from being included in the feedback coefficient, the deterioration of the detection precision can be prevented. Besides, through the feedback operation utilizing the before-catalyst exhaust gas sensor, it is possible to prevent drift of the air-fuel ratio better than when the feedback is suspended and it is also possible to suppress increase of the exhaust gas components.

With these methods, the problem of deterioration in the detection precision can be resolved equivalently as described above.

According to the present invention, the detecting signal contained in the feedback coefficient variation can exclude the influence of the frequency components in the neighborhood of the detecting frequency fid by adopting the above-described methods during the evaluation of the responsiveness in the degradation failure determination process for the exhaust gas sensor. Thus, it is possible to prevent the detection precision deterioration that is caused by combining with the air-fuel ratio feedback, and it is also possible to improve the detection precision for the deterioration failure of the exhaust gas sensor.

While the invention was described with respect to specific embodiments, the invention is not limited to such embodiments.

What is claimed is:

1. A deterioration failure diagnostic apparatus for an exhaust gas sensor disposed in an exhaust gas pipe of an internal-combustion engine, said sensor producing output indicating exhaust gas components, said apparatus comprising:

means for producing a detecting signal and multiplying the produced signal to a basic fuel injection amount used at a normal operation time to calculate a fuel injection amount to be used for determining a condition of the exhaust gas sensor; and means for determining a condition of the exhaust gas sensor based on a frequency response extracted from the output of the exhaust gas sensor produced in response to the calculated fuel injection amount, said frequency response corresponding to said detecting signal.

2. The deterioration failure diagnostic apparatus of claim 1, wherein the detecting signal to be multiplied to the basic fuel injection amount includes a signal obtained by adding either a sine wave, a cosine wave or a trigonometric wave to a predetermined offset value.

3. The deterioration failure diagnostic apparatus of claim 1, wherein the detecting signal to be multiplied to the basic fuel injection amount includes a signal obtained by adding a composite wave of two or more trigonometric function waves to a predetermined offset value.

4. The deterioration failure diagnostic apparatus of claim 1, wherein said means for determining determines the condition of the exhaust gas sensor when a predetermined time elapses since the fuel injection amount multiplied by the detecting signal is supplied to the engine.

5. The deterioration failure diagnostic apparatus of claim 1, wherein said means for determining determines the condition of the exhaust gas sensor by using an output from the exhaust gas sensor after band-pass filtering the output.

6. The deterioration failure diagnostic apparatus of claim 5, wherein said means for determining determines that the exhaust gas sensor is in failure when an integrated value obtained by integrating absolute values of the bandpass-filtered outputs from the exhaust gas sensor is smaller than a predetermined value.

7. The deterioration failure diagnostic apparatus of claim 5, wherein said means for determining determines that the exhaust gas sensor is in failure when a value obtained by a calculation of smoothing absolute values of the bandpass-filtered outputs from the exhaust gas sensor is smaller than a predetermined value.

8. The deterioration failure diagnostic apparatus of claim 1, wherein the exhaust gas sensor comprises a wide-range air-fuel ratio sensor.

9. The deterioration failure diagnostic apparatus of claim 1, further comprising air-fuel ratio controlling means for controlling an air-fuel ratio to be supplied to the internal-combustion engine so as to converge the air-fuel ratio to a predetermined value based on the output of the exhaust gas sensor, wherein the fuel injection amount is corrected in accordance with a feedback coefficient determined based on the output of the exhaust gas sensor.

10. The deterioration failure diagnostic apparatus of claim 9, wherein the feedback coefficient is determined based on an output of either an exhaust gas sensor disposed upstream of a catalytic converter or an exhaust gas sensor disposed downstream of the catalytic converter or outputs from both of the exhaust gas sensors disposed upstream and downstream of the catalytic converter.

11. The deterioration failure diagnostic apparatus of claim 9, wherein the air-fuel ratio controlling means suspends the control of the air-fuel ratio or slows down a feedback speed when supplying the fuel injection amount multiplied by the detecting signal to the internal-combustion engine.

12. A method for diagnosing an exhaust gas sensor disposed in an exhaust gas pipe of an internal-combustion engine for producing an output corresponding to exhaust gas component, comprising:

producing a detecting signal and multiplying the produced signal to a basic fuel injection amount used at a normal operation time to calculate a fuel injection amount to be used for determining a condition of the exhaust gas sensor;

extracting a frequency response corresponding to the detecting signal from an output of the exhaust gas sensor of the engine, the output being produced as the calculated fuel injection amount is supplied to the engine; and determining the condition of the exhaust gas sensor based on the extracted frequency response.

13. The method of claim 12, wherein the detecting signal to be multiplied to the basic fuel injection amount is selected from a group comprising a first signal obtained by adding either a sine wave, a cosine wave or a trigonometric wave to a predetermined offset value and a second signal obtained by adding a composite wave of two or more trigonometric function waves to a predetermined offset value.

14. An electronic control unit for diagnosing an exhaust gas sensor disposed in an exhaust gas pipe of an internal-combustion engine for producing an output corresponding to exhaust gas component, said electronic control unit being programmed to:

produce a detecting signal and multiplying the produced signal to a basic fuel injection amount used at a normal operation time to calculate a fuel injection amount to be used for determining a condition of the exhaust gas sensor;

extract a frequency response corresponding to the detecting signal from an output of the exhaust gas sensor of the engine, the output being produced as the calculated fuel injection amount is supplied to the engine; and determine the condition of the exhaust gas sensor based on the extracted frequency response.

15. The electronic control unit of claim 14, wherein the detecting signal to be multiplied to the basic fuel injection amount is selected from a group comprising a first signal obtained by adding either a sine wave, a cosine wave or a trigonometric wave to a predetermined offset value and a second signal obtained by adding a composite wave of two or more trigonometric function waves to a predetermined offset value.

* * * * *